United States Patent
Sawada et al.

(10) Patent No.: US 7,140,990 B2
(45) Date of Patent: Nov. 28, 2006

(54) CONTROL FOR BELT-TYPE CONTINUOUSLY-VARIABLE TRANSMISSION

(75) Inventors: Makoto Sawada, Aichi (JP); Hironobu Waki, Kanagawa (JP)

(73) Assignee: JATCO Ltd, Fuji (JP)

( * ) Notice: Subject to any disclaimer, the term of this patent is extended or adjusted under 35 U.S.C. 154(b) by 637 days.

(21) Appl. No.: 10/674,069

(22) Filed: Sep. 30, 2003

(65) Prior Publication Data
US 2004/0127331 A1    Jul. 1, 2004

(30) Foreign Application Priority Data
Sep. 30, 2002    (JP)    ............... 2002-285503

(51) Int. Cl.
 F16H 61/06    (2006.01)
 B60K 41/12    (2006.01)
(52) U.S. Cl. .................................... 474/18; 477/44
(58) Field of Classification Search .......... 474/18, 474/28; 477/39–48; 701/53–54, 55, 58, 701/60–62
See application file for complete search history.

(56) References Cited

U.S. PATENT DOCUMENTS

| 6,081,042 | A | * | 6/2000 | Tabata et al. .............. 180/65.2 |
| 6,695,742 | B1 | * | 2/2004 | Hagiwara et al. ............ 477/45 |
| 2004/0157700 | A1 | | 8/2004 | Katou |

FOREIGN PATENT DOCUMENTS

| JP | (63-207738 A | * | 8/1988 | ................ 477/41 |
| JP | 1-206155 A | | 8/1989 | |
| JP | (01-312261 A | * | 12/1989 | ................ 474/70 |
| JP | (08-338507 A | * | 12/1996 | |

OTHER PUBLICATIONS

U.S. Appl. No. 10/664,031, filed Sep. 17, 2003, Yamamoto et al.
U.S. Appl. No. 10/674,091, filed Sep. 30, 2003, Jozaki et al.
U.S. Appl. No. 10/670,270, filed Sep. 26, 2003, Nobu.
U.S. Appl. No. 10/670,271, Sep. 26, 2003, Nobu.
U.S. Appl. No. 10/662,442, filed Sep. 16, 2003, Ochiai et al.
U.S. Appl. No. 10/670,223, filed Sep. 26, 2003, Wakayama.
U.S. Appl. No. 10/673,549, filed Sep. 30, 2003, Sawada et al.
U.S. Appl. No. 10/670,775, filed Sep. 26, 2003, Shimanaka et al.

* cited by examiner

Primary Examiner—Marcus Charles
(74) Attorney, Agent, or Firm—Foley & Lardner LLP

(57) ABSTRACT

In a belt drive continuously-variable transmission control apparatus, a line pressure control section controls a line pressure to be supplied to a shift control valve for controlling a fluid pressure to a primary pulley, and a secondary pulley, in accordance with an estimated input torque to the continuously-variable transmission, and an input torque estimating section to determine the estimated input torque in accordance with a speed ratio and a torque ratio of the torque converter. The input torque estimating section includes a speed ratio monitoring subsection to examine whether the speed ratio is in an increasing state; and a torque ratio setting subsection to decrease the torque ratio when the speed ratio is in the increasing state.

10 Claims, 7 Drawing Sheets

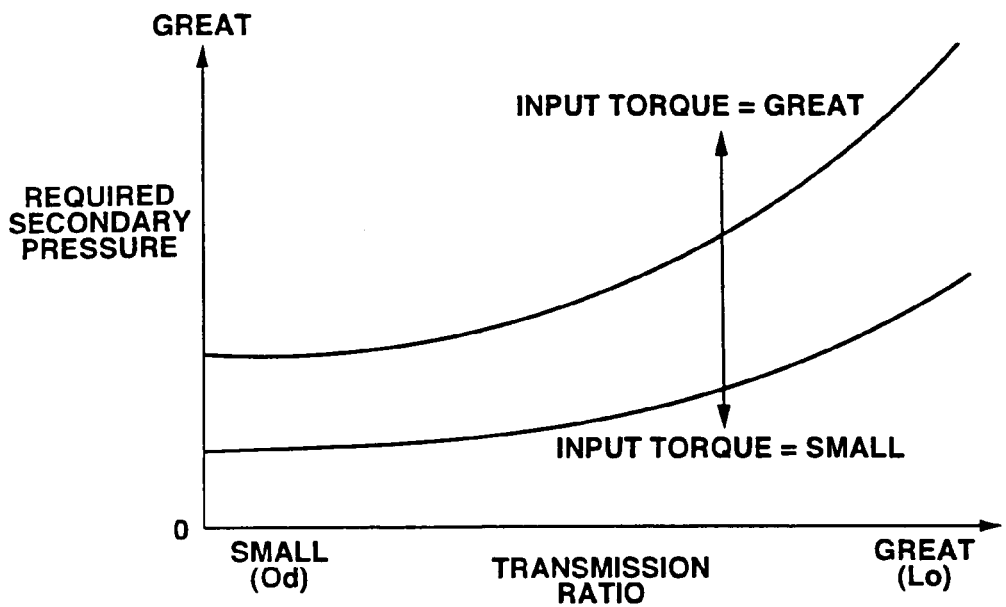
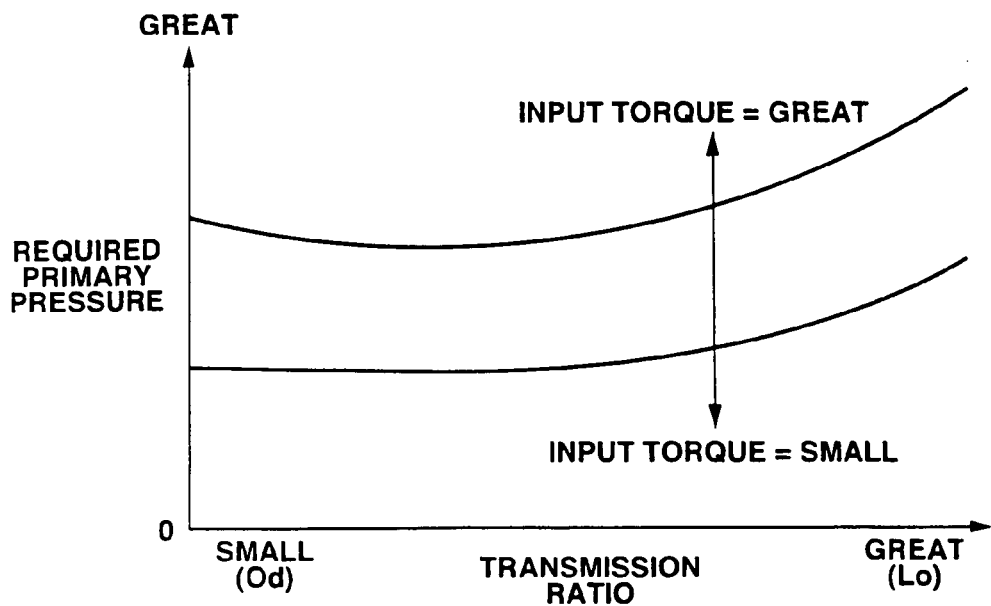

CONTROL FOR BELT-TYPE CONTINUOUSLY-VARIABLE TRANSMISSION

BACKGROUND OF THE INVENTION

The present invention relates to control apparatus and/or method for a belt drive continuously-variable transmission connected with a torque converter.

A continuously-variable transmission (CVT) of one type used for a vehicle is arranged to receive a torque from an engine through a torque converter, and to vary a transmission ratio or gear ratio continuously with primary and secondary pulleys connected by a V belt with each other. A controller for such a continuously-variable transmission calculates a target transmission ratio in accordance with a vehicle speed and a driver's accelerator input or accelerator opening degree corresponding to an accelerator depression degree, and controls the actual transmission ratio toward the target transmission ratio by controlling a fluid pressure to the primary pulley to vary contact widths of the V belt with the primary and secondary pulleys.

The controller of such a system sets a line pressure in accordance with an input torque to the continuously-variable transmission, and controls the contact frictional forces of the V belt with the pulleys with the line pressure. The line pressure, if too low with respect to the input torque, could cause slippage between the V belt and pulleys. An increase of the line pressure too high could increase a drive loss in an oil pump for producing the line pressure.

Because of the interposition of a torque converter between an engine and a continuously-variable transmission, it is not possible to sense the input torque to the transmission directly. Therefore, a control system disclosed in a Japanese Patent Application Publication H01(1989)-206155 is configured to measure a torque converter input revolution speed (=engine speed Ne) and a torque converter output speed (=primary pulley speed Np); to calculate a torque converter speed ratio (=output speed/input speed) e from the measured torque converter input and output speeds; and to estimate an input torque Tat to the continuously-variable transmission by using a speed ratio versus torque ratio map representing a relationship between the speed ratio e and a torque ratio τ of the torque converter.

SUMMARY OF THE INVENTION

If, however, the setting of the torque ratio is inadequate, the line pressure control system could deteriorate the fuel consumption by increasing the line pressure excessively in the state in which the torque converter speed ratio is increasing, and the required line pressure is decreasing. As shown in FIG. 9, an increase ΔNe of the engine speed per one sensing cycle of the engine speed sensor is increased greatly from ΔNe1 to ΔNe2 when the accelerator pedal is depressed. Therefore, an input torque Tat per sensing cycle of the engine speed sensor is increased greatly, and, because of a delay in the calculation of the speed ratio, the control system tends to set the line pressure to a level lower than required, and to cause slippage of the V belt with insufficient belt clamping forces of the pulleys.

If, to prevent belt slippage, a predetermined offset is provided to shift the torque ratio in the positive direction of the speed ratio, in consideration of the delay in the calculation of the speed ratio, then the control system tends to deteriorate the fuel consumption by always supplying the line pressure at an excessive level in the increasing state of the speed ratio.

It is an object of the present invention to provide technique of controlling a belt drive continuously-variable transmission to improve durability of a belt and improve fuel economy.

According to the present invention, a belt drive continuously-variable transmission control apparatus comprises: a belt drive continuously-variable transmission unit including a primary pulley adapted to be connected with an engine through a torque converter, and a secondary pulley connected with the primary pulley by a V belt; a shift control valve to control a fluid pressure to the primary pulley; a shift control section to control an actual transmission ratio of the continuously-variable transmission unit by controlling the shift control valve; a line pressure control section to control a line pressure to be supplied to the shift control valve and the secondary pulley, in accordance with an estimated input torque to the continuously-variable transmission unit; and an input torque estimating section to determine the estimated input torque in accordance with a speed ratio and a torque ratio of the torque converter. The input torque estimating section includes: a speed ratio monitoring subsection to examine whether the speed ratio is in an increasing state; and a torque ratio setting subsection to decrease the torque ratio when the speed ratio is in the increasing state.

According to another aspect of the present invention, a belt drive continuously-variable transmission control apparatus comprises: an actual transmission ratio calculating section to determine an actual transmission ratio of a belt drive continuously-variable transmission unit; an engine torque calculating section to calculate an engine torque of an engine; a torque converter speed ratio determining section to determine a torque converter speed ratio of a torque converter output speed to a torque converter input speed of a torque converter connected with the engine; a speed ratio monitoring section to examine whether the torque converter speed ratio is in an increasing state; a torque ratio setting section to set the torque ratio according to a first characteristic of the torque ratio with respect to the speed ratio when the speed ratio is in the increasing state, and according to a second characteristic of the torque ratio with respect to the speed ratio when the speed ratio is not in the increasing state; an input torque estimating section to determine an estimated input torque to a belt drive continuously-variable transmission, in accordance with the torque ratio and the engine torque; and a line pressure control section to control a line pressure for the belt drive continuously-variable transmission unit in accordance with the actual transmission ratio and the estimated input torque.

According to still another aspect of the present invention, a belt drive continuously-variable transmission control method comprises: a first step of determining an actual transmission ratio of a belt drive continuously-variable transmission unit; a second step of calculating an engine torque of an engine; a third step of determining a torque converter speed ratio of a torque converter output speed to a torque converter input speed of a torque converter connected with the engine; a fourth step of examining whether the torque converter speed ratio is in an increasing state; a fifth step of setting the torque ratio according to a first characteristic of the torque ratio with respect to the speed ratio when the speed ratio is in the increasing state, and according to a second characteristic of the torque ratio with respect to the speed ratio when the speed ratio is not in the increasing state; a sixth step of determining an estimated input torque to a belt drive continuously-variable transmission, in accordance with the torque ratio and the engine torque; and a seventh step of controlling a line pressure for the belt drive continuously-variable transmission unit in accordance with the actual transmission ratio and the estimated input torque.

The other objects and features of this invention will become understood from the following description with reference to the accompanying drawings.

BRIEF DESCRIPTION OF THE DRAWINGS

FIG. 4 is a graph showing a map for determining a required secondary pressure from a transmission ratio and an input torque in the fluid pressure control process of FIG. 3.

FIG. 5 is a graph showing a map for determining a required primary pressure from the transmission ratio and the input torque in the fluid pressure control process of FIG. 3.

DETAILED DESCRIPTION OF THE INVENTION

Figure 1:
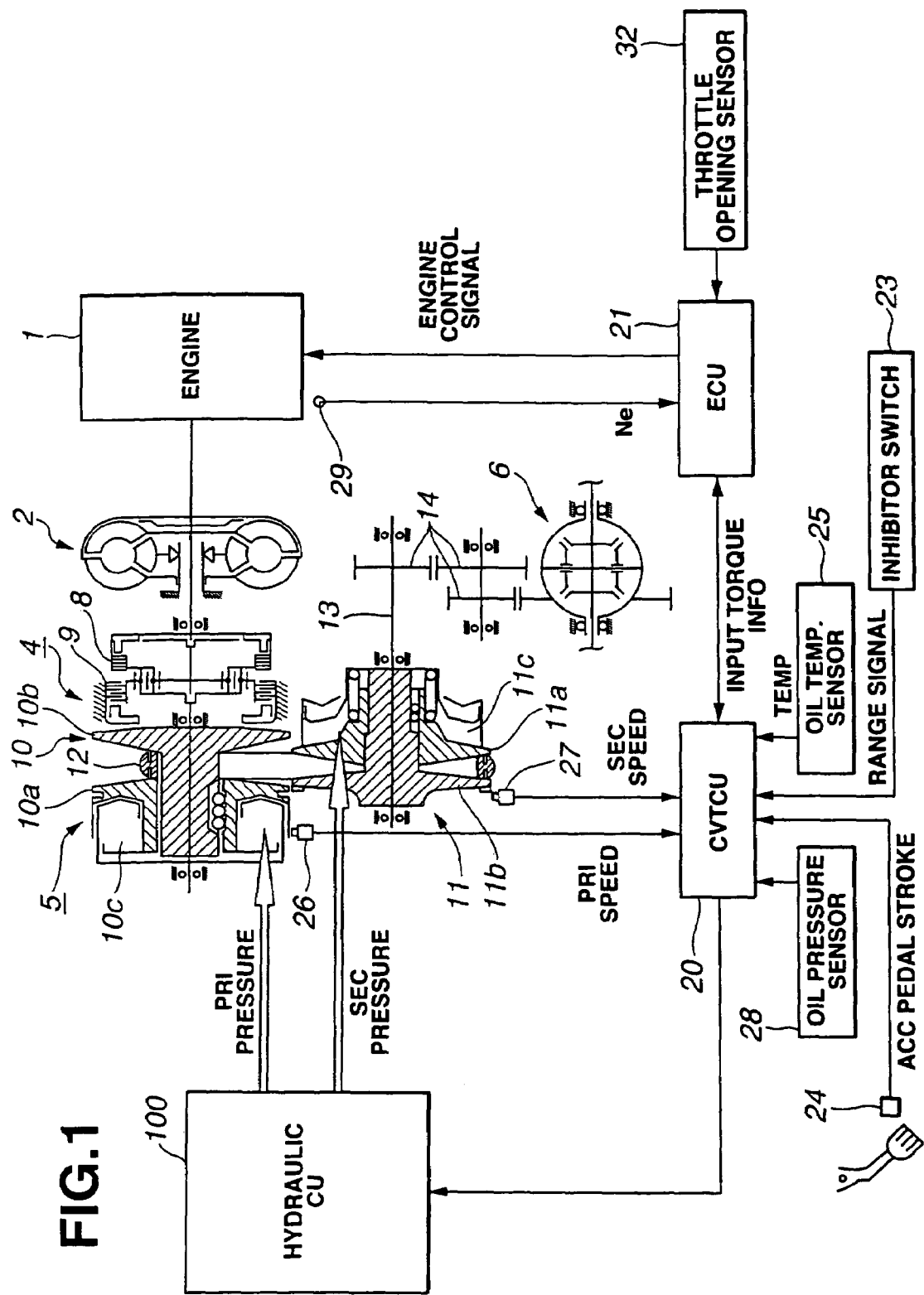
FIG. 1 is a schematic view of a vehicle equipped with a V belt type continuously-variable transmission system according to one embodiment of the present invention.
Figure 2:
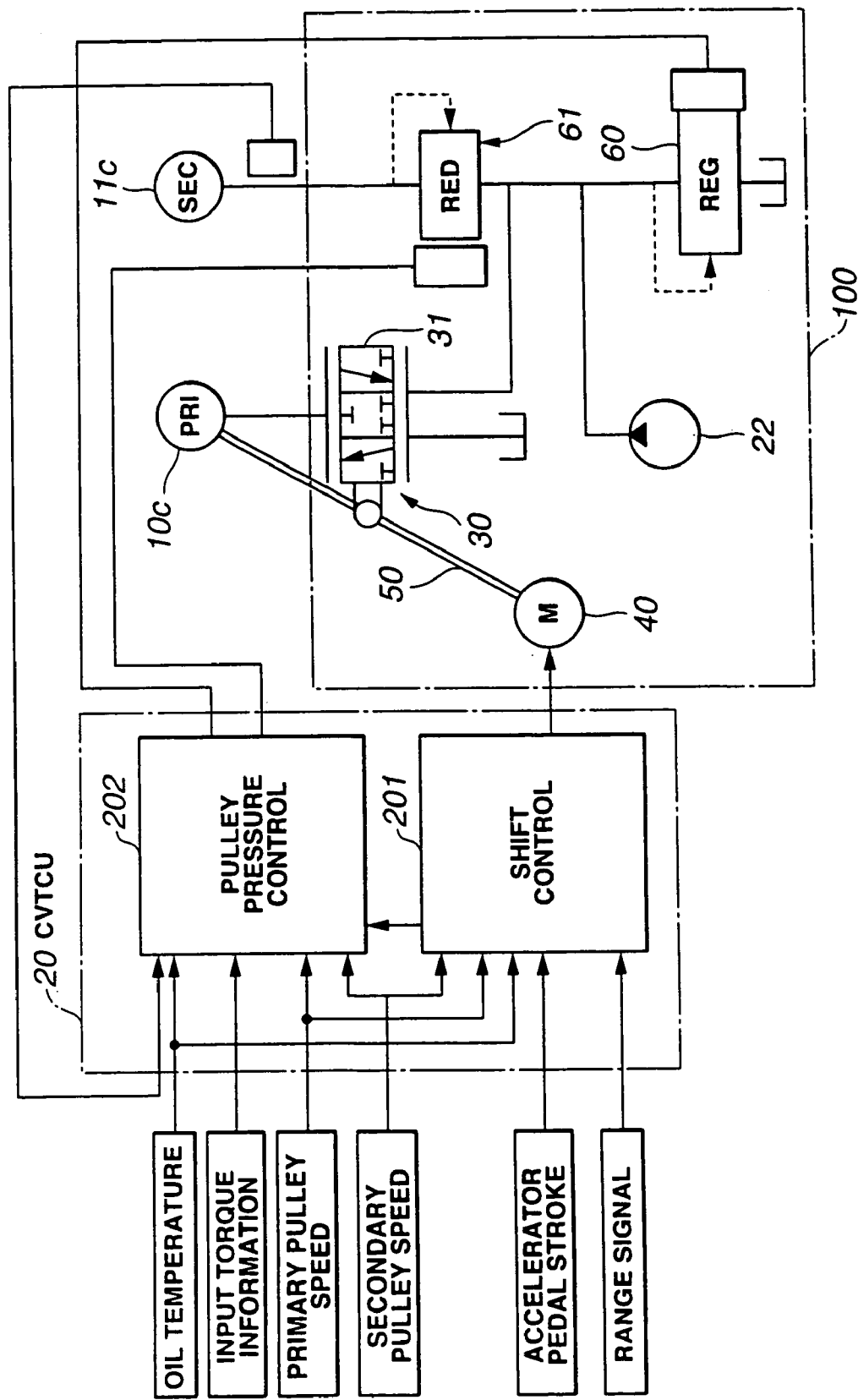
FIG. 2 is a schematic view showing a hydraulic control unit and a CVT control unit in the V belt continuously-variable transmission system of FIG. 1.

Below, an embodiment of the present invention will be explained with reference to the drawings. FIG. 1 is a schematic view showing a V-belt type continuously variable transmission (hereafter referred to as CVT), and FIG. 2 is a conceptual diagram of a hydraulic control unit and a CVT control unit.

As shown in FIG. 1, the CVT 5 is connected through a torque converter 2 having a lockup clutch and a forward-reverse switching mechanism 4, to an engine 1. The CVT 5 includes a pair of adjustable pulleys capable of varying the groove. The pulley on the input side is a primary pulley 10. The pulley on the output side is a secondary pulley 11 connected to an output shaft 13. The primary and secondary pulleys 10 and 11 are connected by a V-belt 12 running therebetween. The output shaft 13 is connected through an idler gear 14 and an idler shaft, to a differential 6.

The transmission ratio of the CVT 5 and contact frictional force between the V-belt and pulleys are controlled by a hydraulic control unit (HCU) 100 in response to commands from a CVT control unit (CVTCU) 20. The CVTCU 20 determines and controls the transmission ratio and contact frictional force based on information about the input torque from an engine control unit (ECU) 21 for controlling the engine 1 and output from the later-mentioned sensors.

CVTCU 20 supplies a stepper motor control signal, a secondary pulley pressure solenoid control signal, and a line pressure solenoid control signal, to hydraulic control unit 100.

The primary pulley 10 in the CVT 5 includes a fixed conical plate 10b rotating integrally with the input shaft and a movable conical plate 10a which is arranged to be opposed to the fixed conical plate 10b to form a V-shaped pulley groove and which can be moved in the axial direction of the input shaft by the hydraulic pressure (primary pressure) acting on a primary pulley cylinder chamber 10c.

On the other hand, the secondary pulley 11 includes a fixed conical plate 11b rotating integrally with the output shaft 13 and a movable conical plate 11a which is arranged to be opposed to the fixed conical plate 11b to form a V-shaped pulley groove and can be moved in the axial direction of the output shaft by the hydraulic pressure (secondary pressure) acting on a secondary pulley cylinder chamber 11c.

In this example, the primary pulley cylinder chamber 10c and the secondary pulley cylinder chamber 11c are designed to have the same ram area or pressure-receiving area.

The drive torque input from the engine 1 is transmitted through the torque converter 2 and the forward-reverse switching mechanism 4 to the CVT 5. In the CVT 5, the drive torque is transmitted from the primary pulley 10 through the V-belt 12 to the secondary pulley 11. At this time, the movable conical plate 10a in the primary pulley 10 and the movable conical plate 11a in the secondary pulley 11 are synchronously displaced in the axial direction to vary each contact radius, that is the distance from the center of rotation to the contact point between the V-belt and each pulley, and this allows the transmission ratio between the primary pulley 10 and the secondary pulley 11 to vary continuously.

The transmission ratio of the CVT 5 and the contact frictional force between the V-belt and pulleys are controlled by the HCU 100.

As shown in FIG. 2, the HCU 100 includes mainly a pressure regulator valve 60 for controlling a line pressure $P_L$ discharged from an oil pump 22, a shift control valve 30 for controlling the hydraulic pressure in the primary cylinder chamber 10c (primary pressure), and a pressure reducing valve 61 for controlling the supply pressure to the secondary pulley cylinder chamber 11c (secondary pressure).

The shift control valve 30 is connected to a servo link 50 which effects mechanical feedback and driven by a stepping motor 40 connected to one end of the servo link 50. Further the shift control valve 30 receives feedback on the pulley width, that is an actual transmission ratio, from the movable conical plate 10a in the primary pulley 10 which is connected to the other end of the servo link 50.

The line pressure control is effected by the pressure regulator valve 60 having a solenoid for regulating the hydraulic pressure applied from the oil pump 22. The pressure regulator valve 60 adjusts the line pressure $P_L$ to the predetermined value responsive to the operating condition of the vehicle, based on commands from the CVTCU 20 such as duty signals.

The line pressure $P_L$ is supplied to the shift control valve 30 for controlling the primary pressure and the pressure reducing valve 61 having a solenoid for controlling the secondary pressure, respectively.

The transmission ratio between the primary pulley 10 and the secondary pulley 11 is controlled by the stepping motor 40 which is driven in response to a shift command signal from the CVTCU 20. More specifically, in response to the stepping motor 40, the servo link 50 is displaced to drive the spool 31 in the shift control valve 30, and thereby the line pressure $P_L$ supplied to the shift control valve 30 is adjusted. The adjusted line pressure $P_L$ is supplied to the primary pulley 10 as the primary pressure to adjust the groove width of the pulley. Thus, the transmission ratio is set to the predetermined value.

The shift control valve 30 effects supplying and discharging of the hydraulic pressure to and from the primary pulley cylinder chamber 10c by displacing the spool 31 and controls the primary pressure so that the transmission ratio reaches the target value commanded in the form of the driving position of the stepping motor 40. When the shift operation has terminated actually, the shift control valve 30 shifts the spool 31 to the closed position in response to displacement of the servo link 50.

In FIG. 1, the CVTCU 20 reads the revolution speed of the primary pulley 10 in the CVT 5 from a primary pulley speed sensor 26; the revolution speed of the secondary pulley 11 from a secondary pulley speed sensor 27; the secondary pressure applied to the cylinder chamber 11c in the secondary pulley 11 from a hydraulic pressure sensor 28; a select position from an inhibitor switch 23; a stroke position (an opening degree of the accelerator pedal) determined by a driver's accelerator input quantity, from an operation sensor (or accelerator position sensor) 24; and an oil temperature of the CVT from an oil temperature sensor 25, respectively. In accordance with input information from these sensors and switch, the CVTCU controls the transmission ratio and the contact frictional forces between the V-belt 12 and pulleys. Moreover, CVTCU 20 also reads the engine speed from an engine speed sensor 29 and the throttle opening TVO from a throttle opening sensor 32 through the ECU 21.

The CVTCU 20 includes a shift control section 201 for determining a target transmission ratio in response to the vehicle speed and the stroke position of the accelerator pedal and for driving the stepping motor 40 to control the actual transmission ratio toward the target value; and a pulley pressure (hydraulic pressure) control section 202 for controlling the thrusts (contact frictional forces) of the primary pulley 10 and the secondary pulley 11 in response to the input torque, the transmission ratio, the oil temperature and the shifting speed.

The pulley pressure control section 202 determines the target value of the line pressure $P_L$ from information about the input torque, the transmission ratio based on the revolution speeds of the primary and the secondary pulleys and the oil temperature, and drives the solenoid of the pressure regulator valve 60 to control the line pressure $P_L$. Further, the pulley pressure control section 202 determines the target value of the secondary pressure. In accordance with the target value of the secondary pressure and the actual value sensed by the hydraulic sensor 28, the pulley pressure control section 202 drives the solenoid in the pressure reducing valve 61, and controls the secondary pressure in the mode of feedback control (or closed loop control).

Figure 3:
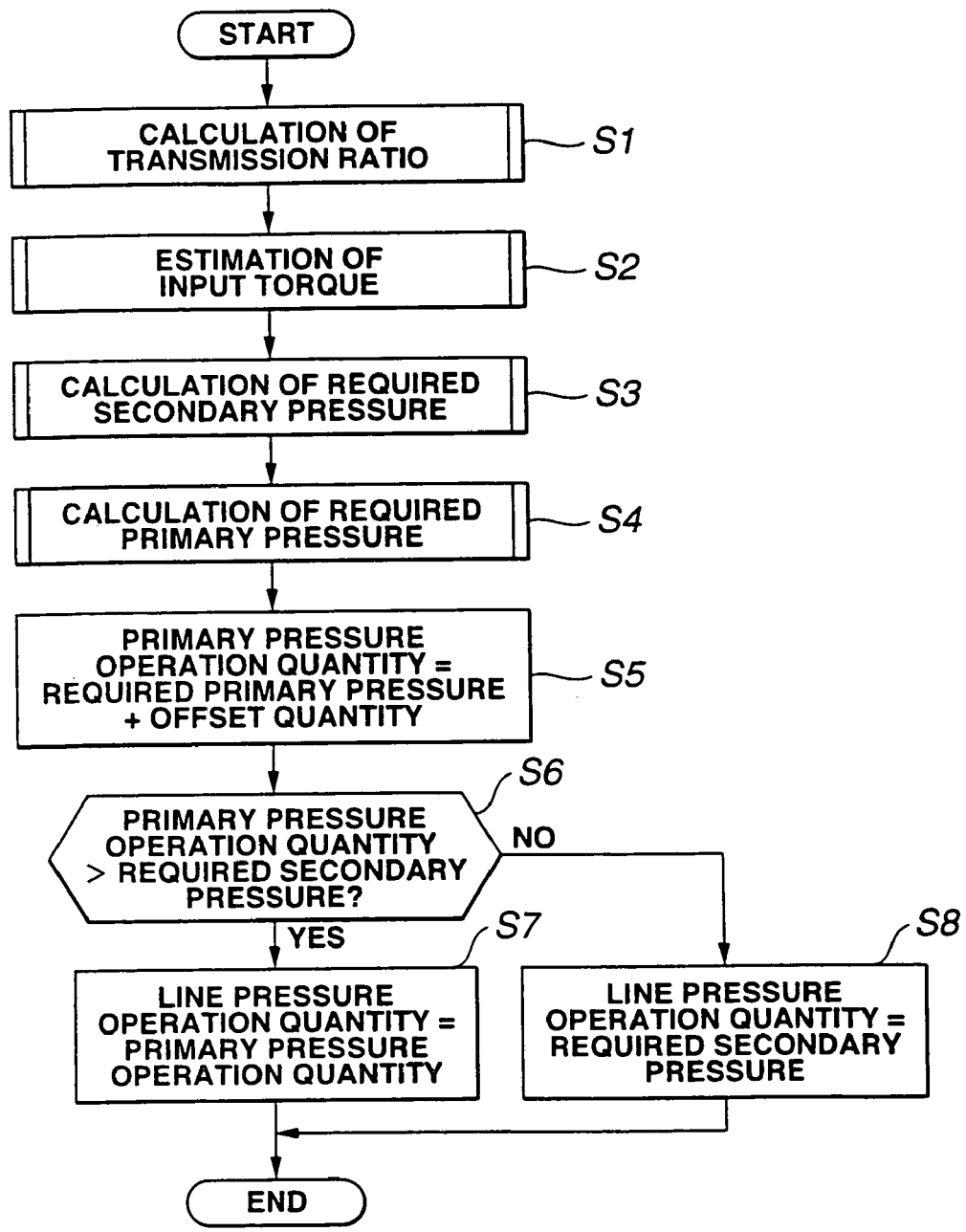
FIG. 3 is a flowchart of a fluid pressure control process performed by a pulley pressure control section in the CVT control unit of FIG. 2.

FIG. 3 shows a line pressure control process performed by CVTCU 20.

First, in step S1, CVTCU 20 calculates an actual transmission ratio. In this embodiment, the actual transmission ratio is calculated from the ratio between the revolution speed of the primary pulley and that of the secondary pulley detected by the primary pulley speed sensor 26 and the secondary pulley speed sensor 27, respectively.

Figure 6:
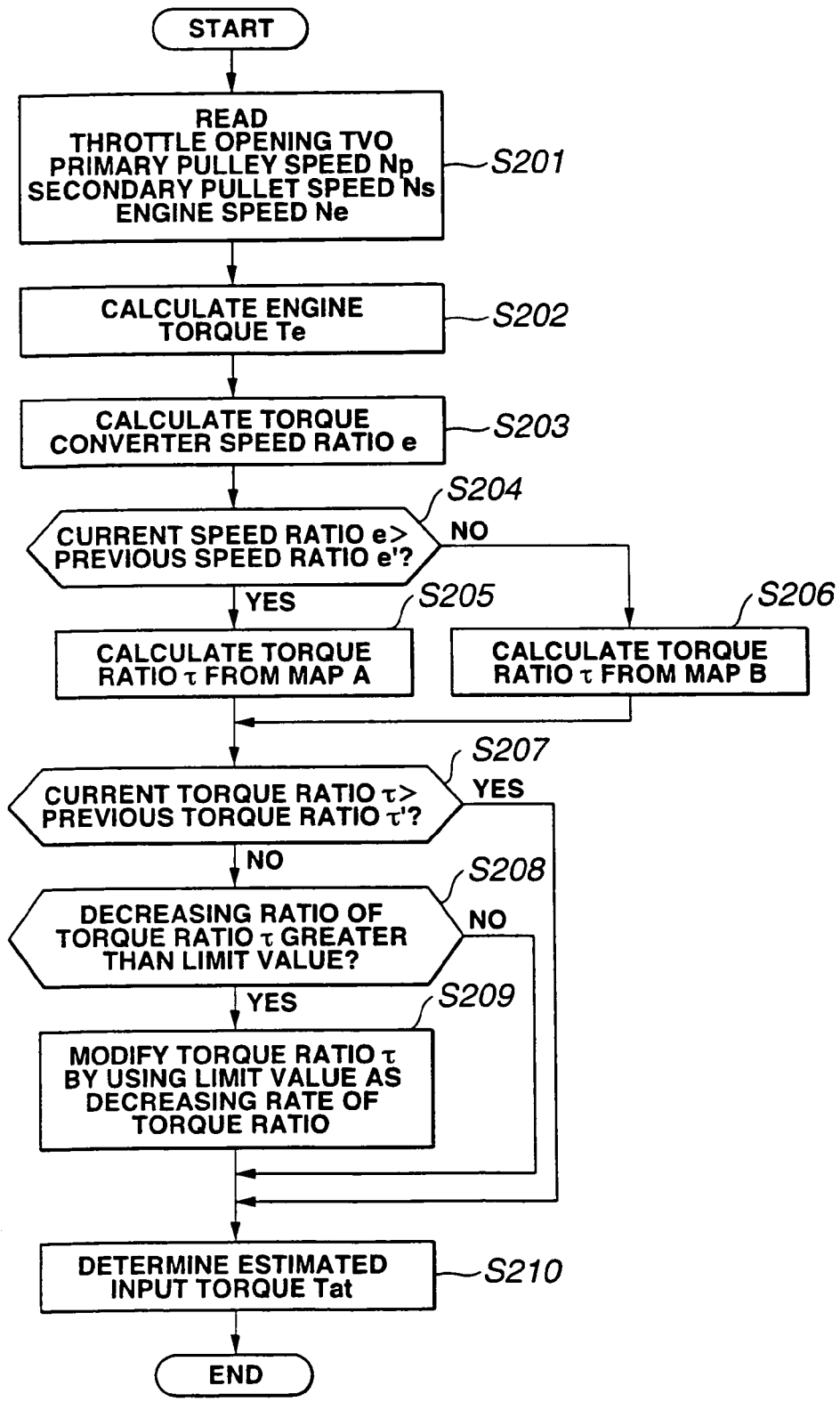
FIG. 6 is a flowchart showing an input torque estimating process performed by the pulley pressure control section in the CVT control unit of FIG. 2.

In step S2, CVTCU 20 estimates an input torque applied to the CVT 5 by an input torque estimation process as shown in a flowchart of FIG. 6, with reference to information about the input torque received from the ECU 21. The details about the input torque estimation process will be described later.

In a next step S3, the CVTCU 20 calculates the required secondary pressure by looking up a map in FIG. 4 based on the actual transmission ratio determined in step S1 and the input torque determined in step S2. This map is preset so that the hydraulic pressure is decreased when the transmission ratio becomes smaller (toward the Overdrive side), and the hydraulic pressure is increased when the transmission ratio becomes larger (toward the Low side). Moreover, the hydraulic pressure is increased, when the input torque is larger, and the hydraulic pressure is decreased when the input torque becomes smaller.

In step S4, CVTCU 20 calculates the required primary pressure by looking up a map in FIG. 5 based on the actual transmission ratio and the input torque determined at the foregoing steps. This map is preset so that the hydraulic pressure is decreased generally when the transmission ratio becomes smaller, and the hydraulic pressure is increased when the transmission ratio become larger. Moreover, the hydraulic pressure is increased when the input torque becomes larger, and the hydraulic pressure is decreased when the input torque becomes smaller. Further, the required primary pressure is higher as compared to the required secondary pressure when the transmission ratio is small, and the required primary pressure is lower as compared to the required secondary pressure when the transmission ratio is large. For some input torque, however, the magnitude relation between the required primary pressure and the required secondary pressure is reversed.

In a next step S5, CVTCU 20 calculates a primary pressure operation quantity, that is the target value of the primary pressure, by the following equation.

[Primary pressure operation quantity]=[required primary pressure]+[offset quantity]

The offset quantity is determined in accordance with the characteristics of the shift control valve 30, as an additional value to the hydraulic pressure to compensate for the pressure loss which is not perfectly proportional to the hydraulic pressure.

In step S6, CVTCU 20 compares the primary pressure operation quantity and the required secondary pressure calculated in step S3 with each other. If the primary pressure operation quantity is greater than the required secondary pressure, and hence the answer of step 56 is YES, the process proceeds to step S7. If the required secondary pressure is equal to or greater than the primary pressure operation quantity, and hence the answer of step S6 is NO, the process proceeds to step 58.

In step S7, CVTCU 20 sets the primary pressure operation quantity as a line pressure operation quantity, that is the target value of the line pressure $P_L$, and terminates the control of the current cycle.

In step 58, CVTCU 20 sets the required secondary pressure as the line pressure operation quantity and terminates the control of the current cycle.

Thus, this control system determines the line pressure operation quantity (target hydraulic pressure) by selecting the larger value between the primary pressure operation quantity and the required secondary pressure; then converts the thus-determined line pressure operation quantity to a control quantity such as a duty signal to drive the solenoid of the pressure regulator valve 60; and thereby drives the pressure regulator valve 60.

FIG. 6 shows the input torque estimation process of step S2.

In step S201, CVTCU 20 reads the throttle opening (degree) TVO, the primary pulley revolution speed Np, the secondary pulley revolution speed Ns, the engine speed Ne from the throttle opening sensor 32, the primary pulley speed sensor 26, the secondary pulley speed sensor 27 and the engine speed sensor 29, respectively.

In step S202, CVTCU 20 determines an engine torque Te by looking up a predetermined map based on the throttle opening TVO and the engine speed Ne.

In step S203, CVTCU 20 determines a speed ratio e between the input speed and the output speed of the torque converter 2 based on the primary pulley revolution speed Np and the engine speed Ne.

In step S204, CVTCU 20 checks if the current speed ratio e calculated in step 5203 is greater than the previous speed ratio e' calculated in the previous cycle. If the speed ratio e is in an increasing state in which the current speed ratio e is greater than the previous speed ratio e' (e>e'), and the answer of step S204 is YES, the process proceeds to step S205. If the speed ratio e is in a non-increasing state in which the current speed ratio e is equal to or less than the previous speed ratio e' (e≦e'), and hence the answer of step S204 is NO, the process proceeds to step S206.

Figure 7:
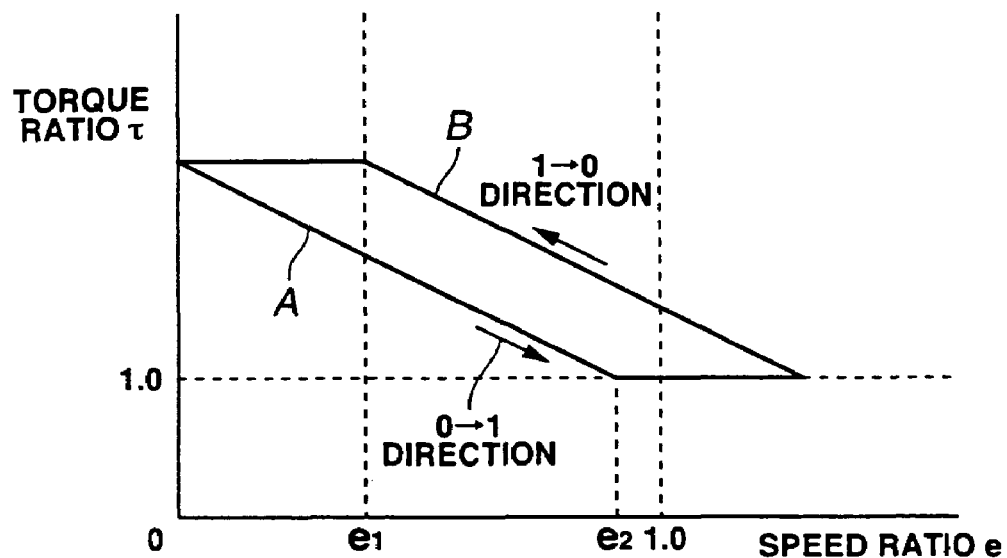
FIG. 7 is a graph showing a map between a torque converter speed ratio and a torque converter torque ratio used in the input torque estimating process of FIG. 6.

In step S205, CVTCU 20 determines a torque ratio τ by looking up a first map (Map A) representing a relation between the speed ratio and the torque ratio, as shown by a line segment A in FIG. 7. Map A is preliminarily determined according to the relation between the speed ratio and the torque ratio obtained from the actual characteristics of the torque converter. In Map A, the torque ratio decreases as the torque converter speed ratio e increases in the range between 0 to $e_2$.

In step 5206, CVTCU 20 determines the torque ratio τ by looking up a second map (Map B) representing the relation between the speed ratio and the torque ratio, as shown by a line segment B in FIG. 7. In consideration of delay in the calculation of the speed ratio, the torque ratio of Map B is preset higher than that of Map A by offsetting by $e_1$ in the plus direction of the speed ratio with respect to Map A. The torque ratio is kept constant at a maximum in the range of the speed ratio e from 0 to e1. Thus, at the same given speed ratio, the torque ratio τ is set to a smaller value in the case of the speed ratio being in the increasing state, and to a greater value greater than the smaller value in the case of the speed ratio being in the decreasing state.

In step S207, CVTCU 20 checks if the current torque ratio τ determined in step S205 or S206 is greater than the previous torque ratio τ' determined in the previous cycle. If the current torque ratio τ is greater than the previous torque ratio τ' (τ>τ'), and hence the answer of step S207 is YES, the process proceeds to a step S210. If the torque ratio τ is equal to or less than the previous torque ratio τ' (τ≦τ'), and hence the answer of step S207 is NO, the process proceeds to step S208.

In step S208, CVTCU 20 checks if the decreasing rate of the torque ratio τ (or the time rate of decrease of τ) is greater than a predetermined limit value, which, in this example, is 1.0/sec. If the decreasing rate is greater than the limit value, and hence the answer of step S208 is YES, the process proceeds to step S209. If the decreasing rate is equal to or less than the limit value, and the answer of step S208 is NO, the process proceeds to step S210.

In step S209, CVTCU 20 imposes a limitation on change of the torque ratio in the decreasing direction. In this example, CVTCU 20 modifies the torque ratio τ by using the limit value (1.0/sec) as the decreasing rate of the torque ratio τ.

Figure 8:
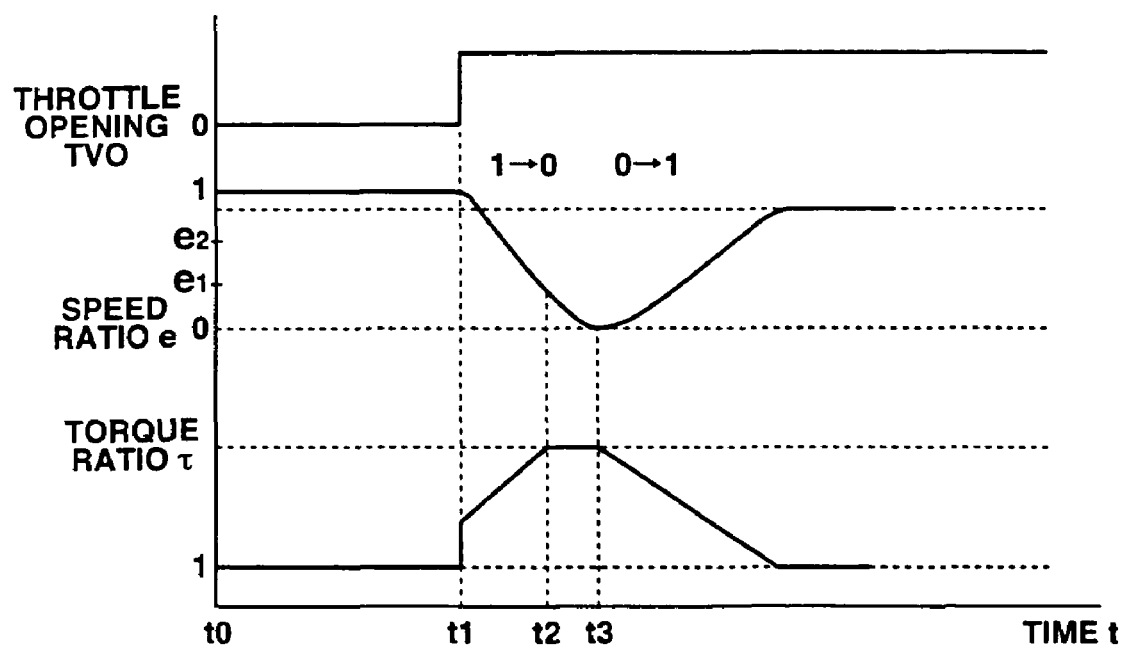
FIG. 8 is a time chart for illustrating control performance of the input torque estimation of FIG. 6 when an accelerator pedal is depressed in an un-lockup coast region.
Figure 9:
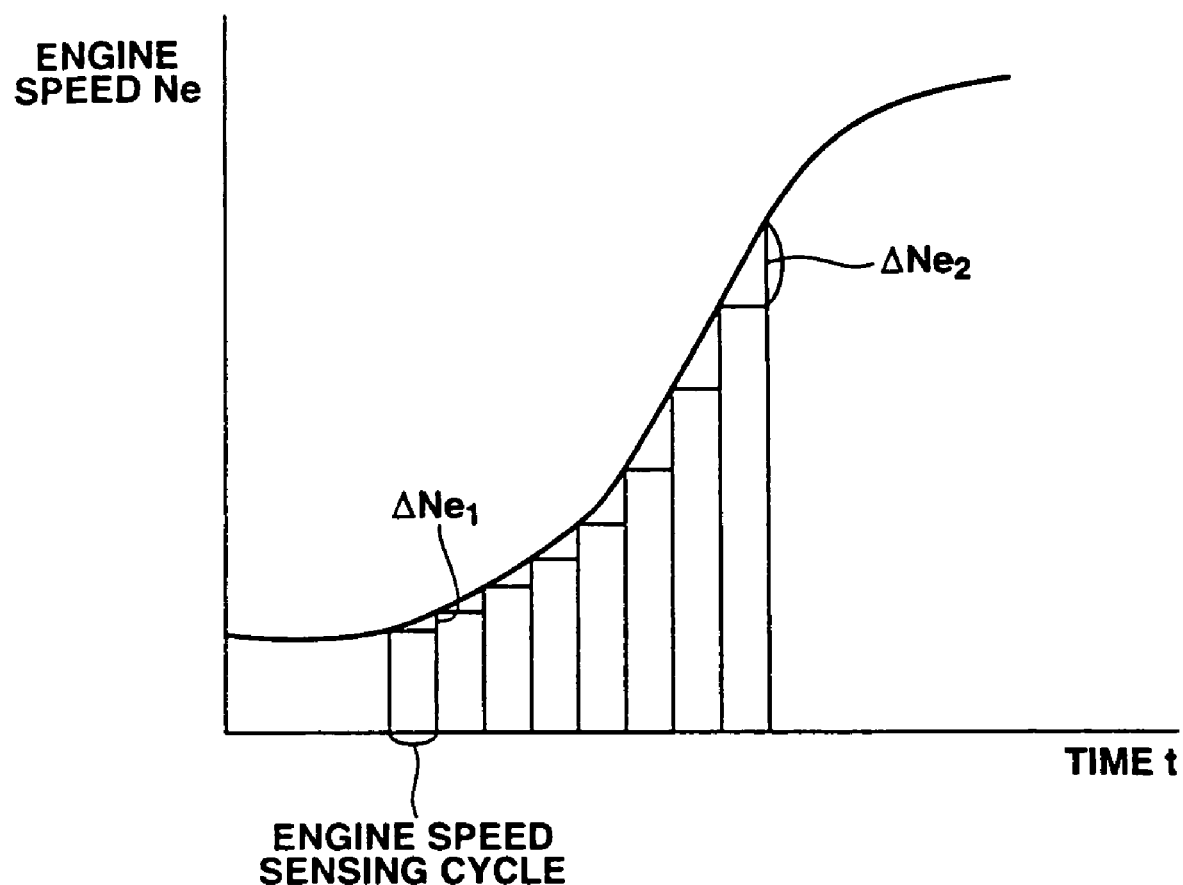
FIG. 9 is a graph of an engine speed increase per engine speed sensing cycle time variation of the engine speed.

In step S210, CVTCU 20 estimates an input torque Tat based on the torque ratio τ and the engine torque Te, and terminates the control in the current cycle. In this example, the input torque Tat is determined by multiplication between the torque ratio τ and the engine torque Te Below, the description is about the control operation based on the above input torque estimation process. FIG. 8 is a time-chart showing time variation of the throttle opening TVO, the torque converter speed ratio e and the torque converter torque ratio τ in the case where the accelerator pedal is depressed in an unlockup coast region.

During the time period between $t_0$ to $t_1$, the throttle opening TVO is kept constant at 0, so that the speed ratio e is kept constant at a level higher than a predetermined value, and the torque ratio τ is kept constant at 1. During this period, the process proceeds by the flow of S201→S202→S203→S204→S206→S207→S208→S210 in the flowchart of FIG. 6.

At the instant $t_1$ at which the driver depresses the accelerator pedal, the throttle opening TVO increases abruptly, the speed ratio e starts decreasing, and the torque ratio τ increases. In this case, the flow in FIG. 6 is: S201→S202→S203→S204→S206→S207→S210.

More specifically, step S204 judges the speed ratio e to be less than or equal to the previous speed ratio e', and therefore, step S206 calculates the torque ratio τ by looking up Map B in FIG. 7. Then, step S207 judges the torque ratio τ to be greater than the previous torque ratio τ' and step S210 estimates the input torque Tat. Thereafter, at the instant $t_2$ when the speed ratio e comes down to $e_1$, the torque ratio τ reaches its maximum. The torque ratio is kept at the maximum value until the instant $t_3$ at which the speed ratio e starts increasing. During the period between $t_2$ to $t_3$, the input torque Tat is estimated from the maximum value of the torque ratio.

At instant $t_3$, the speed ratio e starts increasing and the torque ratio τ starts decreasing. In this case, the process proceeds by the flow of S201→S202→S203→S204→S205→S207→S208→S210 in the flowchart of FIG. 6.

More specifically, step S204 judges the speed ratio e to be greater than the previous speed ratio e', and step S205 calculates the torque ratio τ by looking up Map A in FIG. 7. Then, step S207 judges the torque ratio τ to be equal to or less than the previous torque ratio τ'; step S208 judges the decreasing rate of the torque ratio τ to be equal to or less than the limit value; and step S210 estimates the input torque Tat.

The V-belt type continuously-variable transmission system according to the illustrated embodiment of the present invention can provide the following effects. The system can prevent the line pressure $P_L$ from rising excessively and enhance the fuel economy when the torque converter speed ratio e is increasing. On the other hand, in the case that the speed ratio e is in the decreasing state, for example, due to depression of the accelerator pedal in an unlockup coast region, the system can ensure the line pressure $P_L$ at sufficient levels. Therefore, the system can effectively protect the line pressure from being decreased too much by a delay in calculation of the speed ratio e, and thereby improve the strength and the durability of the belt. In the example shown in FIG. 7, the characteristic of the map B is formed simply by offsetting the characteristic of the map A in the positive or plus direction of the speed ratio, so that the operation for setting the characteristics is simplified.

When the calculated decreasing rate of the torque rate $\tau$ exceeds the predetermined limit value, the CVTCU 20 limits the decreasing rate of torque ratio to the limit value, and thereby prevent undesired hunting even though the accelerator pedal is consecutively depressed and released. Consequently, the system can limit the range of variation of the line pressure $P_L$, and prevent adverse influence on the hydraulic control system, and the occurrence of belt slippage.

Further, no limitations are imposed on changes of the torque ratio $\tau$ in the increasing direction, and the system can set the torque ratio $\tau$ adequately in accordance with the actual torque when the input torque Tat increases. In this point, too, the system can protect the belt against belt slippage.

In the illustrated embodiment, at least one of the items 20, 40 and 201 can serve as a shift control section to control the actual transmission ratio of the continuously-variable transmission unit by controlling the shift control valve. At least one of the items 20, 60 and 202 can serve as a line pressure control section to control the line pressure in accordance with the estimated input torque to the continuously-variable transmission unit. Step S2 or step S210 corresponds to an input torque estimating section. Steps S203 and S204 correspond to a speed ratio monitoring subsection to examine whether the speed ratio is in the increasing state or not. Steps S205 and S206 correspond to a torque ratio setting subsection to decrease the torque ratio when the speed ratio is in the increasing state.

Step S208 corresponds to a torque ratio variation monitoring subsection to detect a rate of change of the torque ratio. Step S207 corresponds to a torque ratio changing direction discriminating subsection to examine whether the torque ratio is in a decreasing direction or not. Step S209 corresponds to a torque ratio variation limiting subsection to limit a change of the torque ratio when the torque ratio is in the decreasing direction. Step S1 corresponds to an actual transmission ratio calculating section to calculate an actual transmission ratio of a belt drive continuously-variable transmission unit. Step S202 corresponds to an engine torque calculating section to calculate an engine torque. Step S203 corresponds to a torque converter speed ratio determining section to determine a torque converter speed ratio. Steps S3~S8 correspond to the line pressure control section. Step S1 corresponds to a step of determining an actual transmission ratio of a belt drive continuously-variable transmission unit. Step S202 corresponds to a step of calculating an engine torque. S203 corresponds to a step of determining a torque converter speed ratio. Steps S203 and S204 correspond to a step of examining whether the torque converter speed ratio is in an increasing state. Steps S205 and S206 correspond to a step of setting the torque ratio according to a first characteristic of the torque ratio with respect to the speed ratio when the speed ratio is in the increasing state, and according to a second characteristic of the torque ratio with respect to the speed ratio when the speed ratio is not in the increasing state. Step S210 corresponds to a step of determining an estimated input torque to a belt drive continuously-variable transmission, in accordance with the torque ratio and the engine torque. Steps S3~S8 correspond to a step of controlling the line pressure for the belt drive continuously-variable transmission unit in accordance with the actual transmission ratio and the estimated input torque.

This application is based on a prior Japanese Patent Application No. 2002-285503 filed on Sep. 30, 2002. The entire contents of this Japanese Patent Applications No. 2002-285503 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A belt drive continuously-variable transmission control apparatus comprising:
   a belt drive continuously-variable transmission unit including a primary pulley adapted to be connected with an engine through a torque converter, and a secondary pulley connected with the primary pulley by a V belt;
   a shift control valve to control a fluid pressure to the primary pulley;
   a shift control section to control an actual transmission ratio of the continuously-variable transmission unit by controlling the shift control valve;
   a line pressure control section to control a line pressure to be supplied to the shift control valve and the secondary pulley, in accordance with an estimated input torque to the continuously-variable transmission unit; and
   an input torque estimating section to determine the estimated input torque in accordance with a speed ratio and a torque ratio of the torque converter, the input torque estimating section including;
   a speed ratio monitoring subsection to examine whether the speed ratio is in an increasing state; and
   a torque ratio setting subsection to decrease the torque ratio when the speed ratio is in the increasing state so that the torque ratio at a given value of the speed ratio becomes smaller when the speed ratio is in the increasing state than when the speed ratio is in a decreasing state.

2. The belt drive continuously-variable transmission control apparatus as claimed in claim 1, wherein the input torque estimating section further includes:
   a torque ratio variation monitoring subsection to detect a rate of change of the torque ratio;
   a torque ratio changing direction discriminating subsection to examine whether the torque ratio is in a decreasing direction or not; and
   a torque ratio variation limiting subsection to limit a change of the torque ratio when the torque ratio is in the decreasing direction.

3. The belt drive continuously-variable transmission control apparatus as claimed in claim 2, wherein the torque ratio variation limiting subsection is configured to impose no limitation on the change of the torque in an increasing direction, and to impose limitation on the change of the torque ratio in the decreasing direction.

4. The belt drive continuously-variable transmission control apparatus as claimed in claim 1, wherein the shift control section is configured to determine a target transmission ratio in accordance with a vehicle operating condition of a vehicle including the engine and the torque converter and to control the actual transmission ratio of the continuously-variable transmission unit so as to achieve the target transmission unit; and the input torque estimating section of the line pressure control section is configured to calculate the speed ratio of the torque converter, to determine the torque ratio of the torque converter in a first mode when the speed ratio is in the increasing state), and in a second mode when the speed ratio is not in the increasing state, and to determine the estimated input torque in accordance with the torque ratio and an engine torque.

5. A belt drive continuously-variable transmission control apparatus comprising:
- an actual transmission ratio calculating section to determine an actual transmission ratio of a belt drive continuously-variable transmission unit;
- an engine torque calculating section to calculate an engine torque of an engine;
- a torque converter speed ratio determining section to determine a torque converter speed ratio of a torque converter output speed to a torque converter input speed of a torque converter connected with the engine;
- a speed ratio monitoring section to examine whether the torque converter speed ratio is in an increasing state;
- a torque ratio setting section to set a torque ratio according to a first characteristic of the torque ratio with respect to the speed ratio when the speed ratio is in the increasing state, and according to a second characteristic of the torque ratio with respect to the speed ratio when the speed ratio is not in the increasing state;
- an input torque estimating section to determine an estimated input torque to the belt drive continuously-variable transmission unit, in accordance with the torque ratio and the engine torque; and
- a line pressure control section to control a line pressure for the belt drive continuously-variable transmission unit in accordance with the actual transmission ratio and the estimated input torque.

6. The belt drive continuously-variable transmission control apparatus as claimed in claim 5, wherein the first characteristic is lower than the second characteristic so that the torque ratio at a given value of the speed ratio becomes smaller when the speed ratio is in the increasing state than when the speed ratio is in a decreasing state.

7. The belt drive continuously-variable transmission control apparatus as claimed in claim 5, wherein the first characteristic is a characteristic determined from a characteristic of the torque converter.

8. The belt drive continuously-variable transmission control apparatus as claimed in claim 5, wherein the second characteristic is a characteristic offset from the first characteristic in a positive direction of the speed ratio by a predetermined amount.

9. A belt drive continuously-variable transmission control method comprising:
- a first step of determining an actual transmission ratio of a belt drive continuously-variable transmission unit;
- a second step of calculating an engine torque of an engine;
- a third step of determining a torque converter speed ratio of a torque converter output speed to a torque converter input speed of a torque converter connected with the engine;
- a fourth step of examining whether the torque converter speed ratio is in an increasing state;
- a fifth step of setting a torque ratio according to a first characteristic of the torque ratio with respect to the speed ratio when the speed ratio is in the increasing state, and according to a second characteristic of the torque ratio with respect to the speed ratio when the speed ratio is not in the increasing state;
- a sixth step of determining an estimated input torque to the belt drive continuously-variable transmission unit, in accordance with the torque ratio and the engine torque; and
- a seventh step of controlling a line pressure for the belt drive continuously-variable transmission unit in accordance with the actual transmission ratio and the estimated input torque.

10. The belt drive continuously-variable transmission control method as claimed in claim 9, wherein the second characteristic is a characteristic offset from the first characteristic in a positive direction of the speed ratio by a predetermined amount.

* * * * *